United States Patent
Boone

(10) Patent No.: US 6,772,554 B1
(45) Date of Patent: Aug. 10, 2004

(54) FISH HANDLING TOOL

(76) Inventor: Charles A. Boone, 1080 Margaret St., Lake City, FL (US) 32025

( * ) Notice: Subject to any disclaimer, the term of this patent is extended or adjusted under 35 U.S.C. 154(b) by 0 days.

(21) Appl. No.: 10/385,702

(22) Filed: Mar. 12, 2003

(51) Int. Cl.[7] .............................................. A01K 97/00
(52) U.S. Cl. ....................................................... 43/54.1
(58) Field of Search .......................................... 43/54.1

(56) References Cited

U.S. PATENT DOCUMENTS

| | | | | |
|---|---|---|---|---|
| 1,498,777 A | * | 6/1924 | Blomberg ......................... 43/4 |
| 2,631,402 A | * | 3/1953 | Lastofka .......................... 43/55 |
| 3,590,423 A | * | 7/1971 | Messer ......................... 452/194 |
| 3,968,588 A | * | 7/1976 | Peterson, Sr. ................. 43/53.5 |
| 4,196,538 A | * | 4/1980 | Crone .............................. 43/55 |
| 4,697,380 A | * | 10/1987 | Fenske ........................... 43/55 |
| 5,305,544 A | * | 4/1994 | Testa, Jr. ...................... 43/54.1 |
| 5,864,981 A | * | 2/1999 | Zeman ......................... 43/54.1 |
| D407,461 S | * | 3/1999 | Creel .......................... D22/149 |
| 6,067,745 A | * | 5/2000 | Adams et al. .................. 43/55 |
| 6,185,860 B1 | * | 2/2001 | Thibodeaux ................ 43/54.1 |
| 6,200,212 B1 | * | 3/2001 | Henry et al. ................ 452/194 |

* cited by examiner

Primary Examiner—Charles T. Jordan
Assistant Examiner—Bret Hayes
(74) Attorney, Agent, or Firm—Liniak, Berenato & White

(57) ABSTRACT

A device for holding a fish after being caught by an angler to allow the removal of a hook. The device permits an angler to firmly grasp the fish without having to physically touch the fish. The device utilizes a pedal in conjunction with a cantilever to facilitate movement of a hammer to secure the fish. Once held, a hook removal device is employed to remove the hook from the fish's mouth. The device further contains a tool compartment for storing items essential to all anglers and a live well for keeping caught fish alive after removing the hook.

12 Claims, 2 Drawing Sheets

FISH HANDLING TOOL

BACKGROUND OF THE INVENTION

1. Field of the Invention

This invention relates to a device to remove a fishhook from a fish. More specifically, this invention relates a device that permits an angler to remove a fishhook from the mouth of a fish without having to grasp the fish within his hand.

2. Description of Related Art

When fishing, it is desirable to have a means to extract a hook from a fish's mouth without having to have to physically touch the fish. Removal of a fishhook from the mouth of a fish presents several risks to an angler. In order to remove the hook, the angler must place his hand in close proximity to a fish's mouth. Several species of fish has extremely sharp teeth and can cause an injury to the angler. Another hazard is from the hook itself. In angler is not always capable of seeing the exact placement of the hook within the fish's mouth, then the angler runs a substantial risk of injuring his hand when attempting to remove the hook.

Several species of fish, e.g., catfish, have poisonous spikes or spines that may have an adverse affect on an angler who wrongly comes into contact with the spikes or spines. Fish are typically still alive when first landed, i.e., brought onto dry land. As such, the fish are usually jump and flop around in an attempt to return to the water from which they came. Panfish are difficult to hold after being landed. They are usually very still wet and covered with scales makes it more difficult for an angler to grab a hold the fish firmly. When fish such as catfish are handled, the angler runs the risk of contacting a poisonous spike or spine.

In addition to hazards associated with removal of a hook from a fish's body, fish shed scales and produce an odor. The scales flake off and will affix to an angler's article of clothing or the angler's body itself. The odor will usually affix to anything that comes into contact with the fish, e.g., an angler's hand, pants, shirts, etc. The odor produced is often difficult to remove after a full day of fishing. When coming home, the angler must scrub his body in order to cleanse himself of the odor. Individuals other than anglers are usually not found of the smell.

Another problem with the prior art is that once the hook has been removed, the fish must still be placed into a container. This would require additional handling of the fish by an angler. It preferable that the fish remain alive while held in the container until such a time when the fish ready to be either thrown back into the water or filleted for cooking or preparation for sale.

It is therefore necessary to have a means of removing a fish from a fishing hook with having to contact the body or article of clothing of an angler. In addition, there exists a need to have a container which can hold the fish and keep them alive once the hook has been removed. The removal of the hook and the temporary container to hold the fish should be integrated into a single device.

The present invention achieves the same or better results of the above described by providing a cooler sized box to hold the fish as well as providing a device to remove the hook with out having an angler coming into contact with a fish.

SUMMARY OF THE INVENTION

It is therefore an advantage of the present invention to provide a device to allows for the efficient removal of a hook from a fish's mouth. The device permits an angler to place the fish temporarily on device that clamps down on the fish via actuation of a pedal by the angler. The fish is firmly held tightly and an instrument is inserted into the fish's mouth to remove the hook. The instrument is designed to minimize the damage caused to the fish's throat area or gills while safely removing the hook.

It is another feature of the invention to provide a vise clamp to hold the fish. The vise clamp of the device includes a pedal that is operably connected to a cantilever runs along the bottom baseboard of the device. When the petal is depressed, the cantilever acts upon a fish on a platform at the opposite end of the device. When the angler releases the pedal, the cantilever releases it hold on the fish.

It is another aspect of the invention to have a live well for holding the fish in the device. Once the hook has been removed, the angler can release the pedal and the fish slides into a well or container within the device automatically. The well is filled with water to permit the fish to breath as if in its natural environment. The water used in this section should be taken from the body of water from which the fish was caught. Use of other water may shock the fish or cause premature death to the fish.

It is another purpose of the invention to provide a tool storage compartment. The tool storage compartment is located above the cantilever that runs along the baseboard. The storage box has a lid that slides over top to ensure tools and miscellaneous items are secured and not loose.

These advantages and other novel features of the present invention will become apparent in the following detailed description of the invention when considered in conjunction with the accompanying drawings.

BRIEF DESCRIPTIONS OF THE DRAWINGS

A better understanding of the present invention will be had when reference is made to the accompanying drawings, wherein identical parts are identified by identical reference numbers and wherein.

DETAILED DESCRIPTION OF THE PRESENT INVENTION

Figure 1:
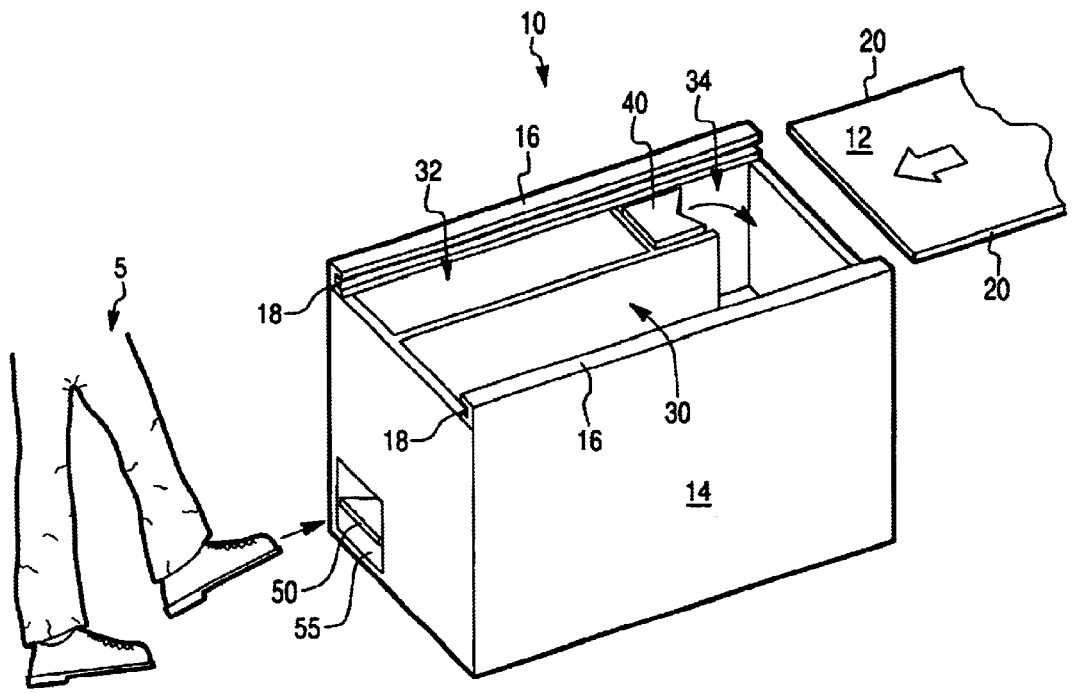
FIG. 1 is a perspective view of the preferred embodiment of the present invention.

The features of the invention as explained above provide an innovative technique for removing a fish from a fishing hook.

A box shaped container 10 is rectangular in shape. The box shaped container 10 has a lid 12 that slidably engages the main body 14. The lid 12 can have a ruler or scale etched into the surface. This allows an angler 5 to determine the length of a fish that has been caught. The lid 12 also provides a smooth surface for filleting a fish in preparation for consumption.

The upper edges 16 of the main body 14 have grooves 18 that engage with the long edges 20 of the lid 12. The grooves 18 are slightly larger than the thickness of the lid 12 so that the lid 12 may slide easily between an open and closed position. The friction fit between the grooves 18 of the upper edges 16 and the lid 12 holds the lid 12 in place from movement. The friction fit requires an additional force other than that created solely by the lid 12 or the main body 14 in order to slide.

The construction of the main body 14 and the lid 12 is not limited to any one material. Now is it necessary that the lid 12 and the main body be constructed from the same materials. Examples of materials that can be used include, but are not limited to: wood, wood composites plastics, steel, aluminum, and other metals.

Ideally, the box shaped container 10 is a size compatible with a standard cooler (not shown in the Figures) that may be purchased within any general store. This permits the box shaped container 10 to be placed within the cooler for transportation and storage. However, the box shaped container 10 is not limited to any particular single size.

Figure 2:
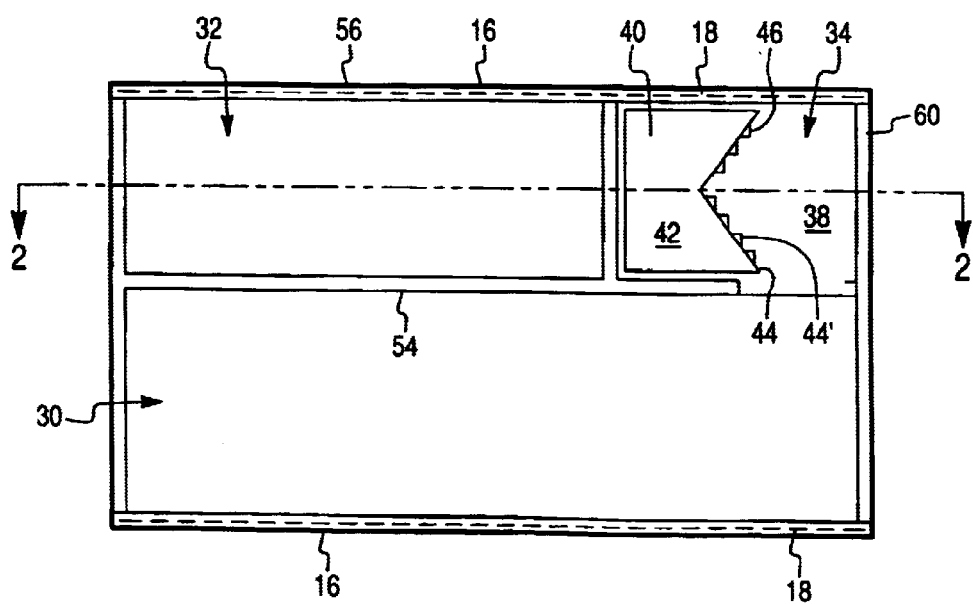
FIG. 2 is a top view of the present invention without the lid showing the tool storage compartment, the live well and the vise clamp as shown in FIG. 1.

Referring to FIG. 2, within the main body 14 are several compartments. The live well 30 runs the length of the long side of the main body 14 parallel to the grooves 18. The live well 30 is also as deep as the main body 14. The live well may be filled with liquid, whether fresh water or salt water, from the body of water wherein the angler 5 is fishing. The allows the fish that is caught and placed in the live well 30 to remain alive until a decision is made by the angler 5 as to what to do with the fish.

Figure 3:
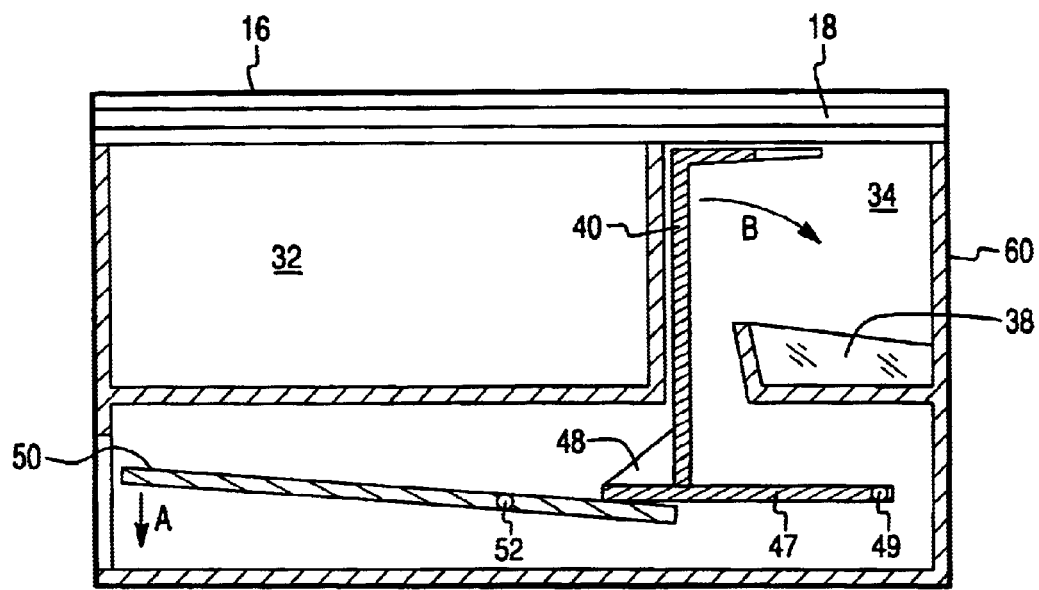
FIG. 3 is a cross section of the box taken along lines 2—2 as shown in FIG. 2 and shows the position of the cantilever.

There is also a tool compartment 32 located parallel to the live well 30. The tool compartment has a false bottom, under which the cantilever 46 (as shown in FIG. 3) that operates the hammer 40 is located. The tool compartment 32 can house spare parts, pliers, miscellaneous fishing equipment, bait, and other items required by the angler 5. Once the lid 12 is slid into the grooves 18 and covers the main body 14, all items in the tool compartment 32 are secured from falling out or being lost.

Located next to the tool compartment is a hook removing section 34. It is within the hook removing section 34 that the hammer 40 is located. The hammer 40 is biased in the vertical position and has a head 42. The forward end 44 of the head 42 is cut in the form of a "V". This allows the forward end 44 of the hammer 40 to firmly hold a fish while the hook is removed as explained hereafter. In addition to the generally V-shaped forward end 44, the hammer terminates with several spikes 44'. The spikes 44' further aid the firm grasping of the fish for hook removal by the hammer 40. While the preferred embodiment of the forward end 44 of the hammer 40 is generally V-shaped, other shapes may also be employed, such as arc or zigzag pattern.

The bottom 38 of the hook removing section 34 is located approximately equal to half the depth of the main body 14. The bottom 38 is sloped, so that the slope is highest at the side walls and lowest along the inner edge of the live well 30. Once the hammer 40 is released, the slope allows a fish to drop into the live well 30 for storage eliminating the need for an angler to handle the fish.

The interrelation of the hammer 40 and pedal 50 is best viewed in the cross section of FIG. 3. A recess is formed in the end wall of the main body 14 through which the pedal 50 can be accessed by a foot of an angler 5. However, actuation of the pedal 50 is not limited to that of the angler's foot; the pedal 50 can also be actuated via a fishing rod, the angler's hand, or any other article that can facilitate movement of the pedal. The pedal 50 is connected to the main body 14 via a metal pin 52. The metal pin 52 is inserted into apertures (not shown in the Figures) on the inner wall 54 and the outer wall 56. The metal pin 52 is ideally held in place by a brass bushing as is commonly known to those skilled in the art. The metal pin 52 acts as the pivot point for the pedal 50. The pedal 50 runs the length of the main body 14 until it rests underneath the hammer 40. The pedal 50 is weighted so that the end proximate the recess 55 is in the up position, as shown in FIG. 3, until an external force is applied.

The hammer 40 has a leg section 47 secured along the bottom. A support section 48 is affixed to the hammer 40 and the leg section 47. A metal pin 49 acts as the pivot point for the hammer 40. The hammer 40 rests on top of the pedal 50 because of the weight of the hammer 40. When the pedal 50 is pushed in the down direction indicated by arrow A by an angler 5, the end of the pedal 50 underneath forces the hammer 40 to rotate about the metal pin 49 as indicated by arrow B.

The bottom 38 of the hook removing section 34 is angled as previously mentioned. Once the hammer 40 is retracted in the opposite direction of the arrow B, the fish slides into the live well 30.

The technique for removing the hook from a fish's mouth will now be explained. Once an angler 5 has caught and landed a fish, the angler grabs a hold of the fishing line or leader 110 with their hand. The fish is then positioned over the hook removing section 34 and lowered tailfin first into the section 34. Once the fish has been placed inside the hook removing section 34 so that approximately its gills are level with the top edge of the main body 14, an angler 5 positions his foot inside the recess 55 and over top of the pedal 50. The angler 5 than presses his foot down on the pedal 50. This force raises the end of the pedal 50 located underneath the hammer 40. The hammer 40 then rotates in the direction of arrow B and firmly positions the fish against the wall 60.

Figure 4:
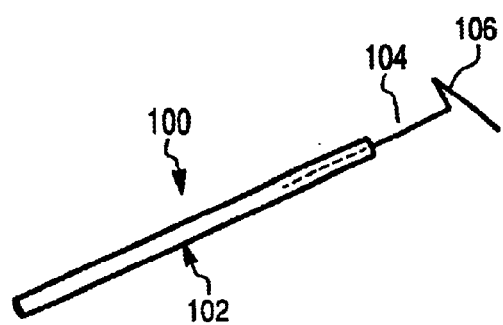
FIG. 4 is a perspective view of the hook removal device.

The hook is then removed from the fish's mouth using a hook removal device 100 as seen in FIG. 4. The hook removal device is made of a handle 102 and hook remover 104. The handle can be constructed of wood, steel, plastic or any other material as is known to those skilled in the art. The hook remover 104 is preferably made from steel or metal that resists corrosion when contacting water or liquids. The hook remover 104 is ideally a 12 gauge wire that is fixed to the handle 102. The hook remover 104 has a crook shape 106. The crook shape 106 allows the hook to be removed successfully as explained hereafter.

Once the pedal is depressed and the fish is held firmly against the side wall 60, the angler draws the fishing line or leader taut with one hand. If at night or in conditions of limited visibility, an angler 5 does not need to use his free hand to remove the hook but rather can use the hook removal device 100 but can run the handle 102 along the leader or line. The other hand holds the hook removal device 100. The crook 106 of the hook removal device 100 is positioned around the fishing line or leader as seen in FIG. 4. The hook removal device 100 is slid along the fishing line or leader toward the fish's mouth. The hook removal device 100 is then further slid along the fishing line or leader until the crook 106 makes contact with the hook.

Once the crook 106 of the hook removal device had made contact with the hook, the angler 5 gently pushes down with the hook removal device 100 into the fish's throat and rotates the crook 106 until the hook is no longer embedded with in the flesh of the fish. The handle 102 is rotated so that the hook is pushed against the handle 102 to prevent rehooking the fish during hook extraction.

Once the hook has been removed from the flesh of the fish and is captured within the crook 106, the angler 5 must maintain tension on the fishing line or leader to prevent the hook from disengaging with the hook removal device. The angler 5 then withdraws the hook removal device 100 while again maintaining tension on the fishing line or leader.

Once the hook is safely removed from the fish's mouth, the angler 5 removes his foot from the pedal 50. The weight of the pedal 50 combined with that of the hammer 40, causes the end of the under the hammer 40 to fall toward the bottom of the main body 14 in the opposite direction of arrow A. Subsequently, the hammer retracts from firmly holding the fish, in the direction opposite of arrow B. The fish then slides into the live well 30 where it is kept until a later time.

Once another fish is caught, the same process is repeated.

While the foregoing invention has been shown and described with reference to several preferred embodiments, it will be understood that various changes in form and detail may be made without departing from the spirit and scope of the present invention. For example, the hook removal device may be replaced with one that is found within novelty shops or specialty shops. The tool compartment can be interchanged with an addition wet well that permits the angler to store live bait in water, again either salt or fresh water depending on where the angler is fishing.

What is claimed:

1. A container for holding at least one fish, comprising:
    a live well for holding a liquid;
    a hook removing section comprising a hammer for securing said at least one fish from moving and an actuator for actuating the hammer, said hammer being pivotally mounted within said hook removing section and said actuator being pivotally mounted and positioned to be activated by an operator to pivot said hammer into a position to secure said at least one fish within said hook removing section;
    wherein said hammer occurs said at least one fish for fishhook removal by at least one of the operator's hands and a hook removal device for removing a fishhook from said at least one fish.

2. The container for holding at least one fish according to claim 1, wherein said hook removal device comprises a handle and a hook remover having a crook shape.

3. The container for holding at least one fish according to claim 1, wherein said
    actuator comprises a pedal;
    said a hammer being biased in a vertical position and moveable upon selective engagement of said pedal by the operator, wherein said hammer has a V-shaped head for securing said at least one fish; and
    wherein said hook removing section further comprises an angled bottom such that upon release of said hammer, said at least one fish slides into said live well.

4. The container for holding at least one fish according to claim 3, wherein said V-shaped head has a plurality of spikes for aiding the securing of said at least one fish.

5. The container for holding at least one fish according to claim 3, wherein said pedal is selectively engageable from an exterior of said container.

6. The container for holding at least one fish according to claim 5, wherein said pedal is recessed in said exterior of said container.

7. The container for holding at least one fish according to claim 1, further comprising a lid, wherein said lid slides along a groove on an upper edge of said container.

8. The container for holding at least one fish according to claim 7, wherein said lid has a ruler integrally formed along a length thereof.

9. The container for holding at least one fish according to claim 1, wherein said container is made from the group consisting of wood, wood composites, plastics, steel, aluminum, and other metals.

10. The container for holding at least one fish according to claim 1, wherein the container is generally rectangular in shape.

11. The container for holding at least one fish according to claim 1, wherein said actuator and said hammer are pivotally mounted to said container, said actuator acting on a bottom of said hammer to cause a pivoting motion of said hammer.

12. The container for holding at least one fish according to claim 1, wherein said hammer pins said at least one fish against a wall of said container to hold a head of said at least one fish in a substantially upright position within said hook removing section.

\* \* \* \* \*